March 25, 1947.    C. W. VARCOE    2,418,059
ANGLE PLATE CLAMPING BRACKET
Filed Aug. 4, 1945    2 Sheets-Sheet 1
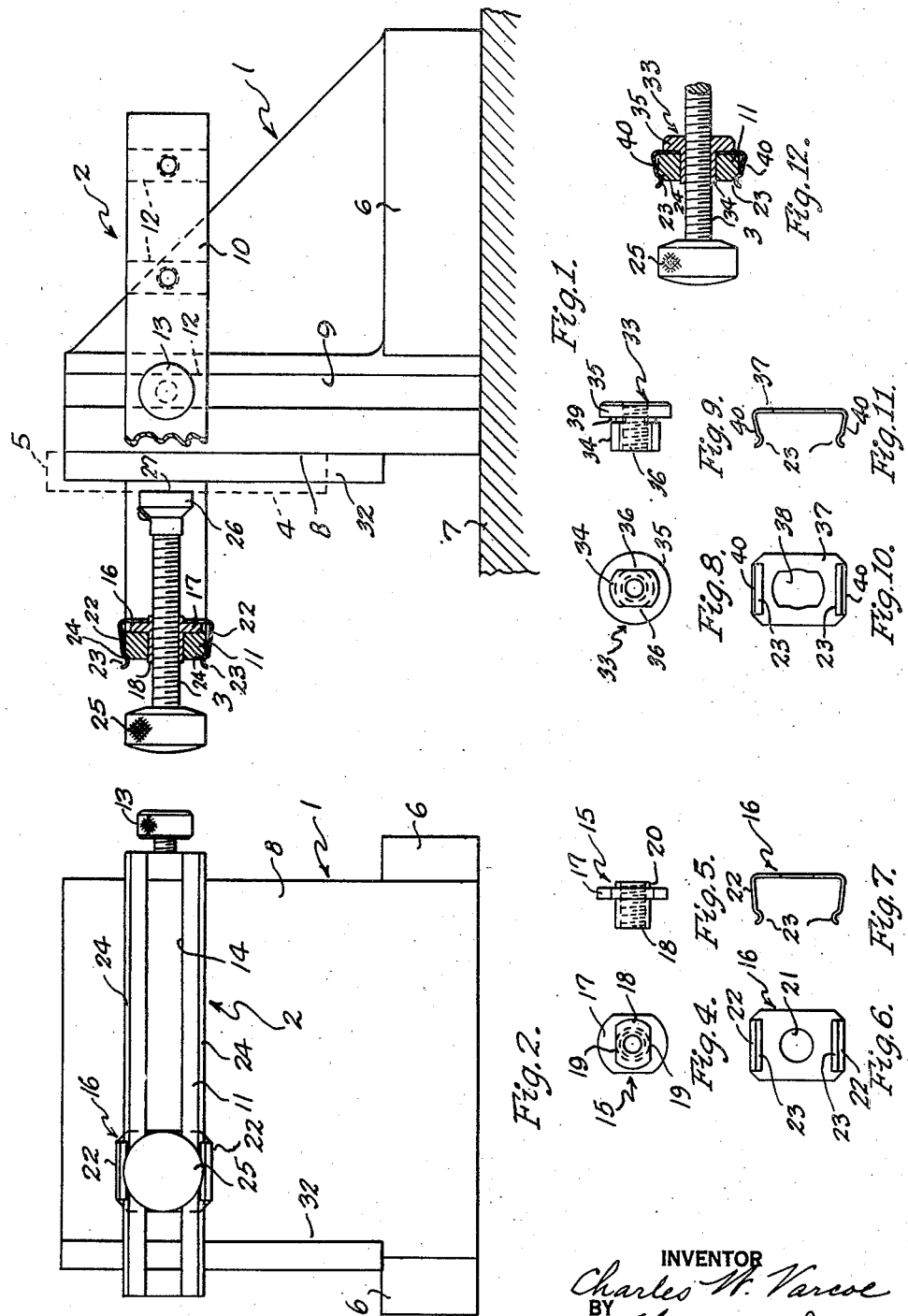
INVENTOR
Charles W. Varcoe
BY
Wooster & Davis
ATTORNEYS.

March 25, 1947. C. W. VARCOE 2,418,059
ANGLE PLATE CLAMPING BRACKET
Filed Aug. 4, 1945 2 Sheets-Sheet 2
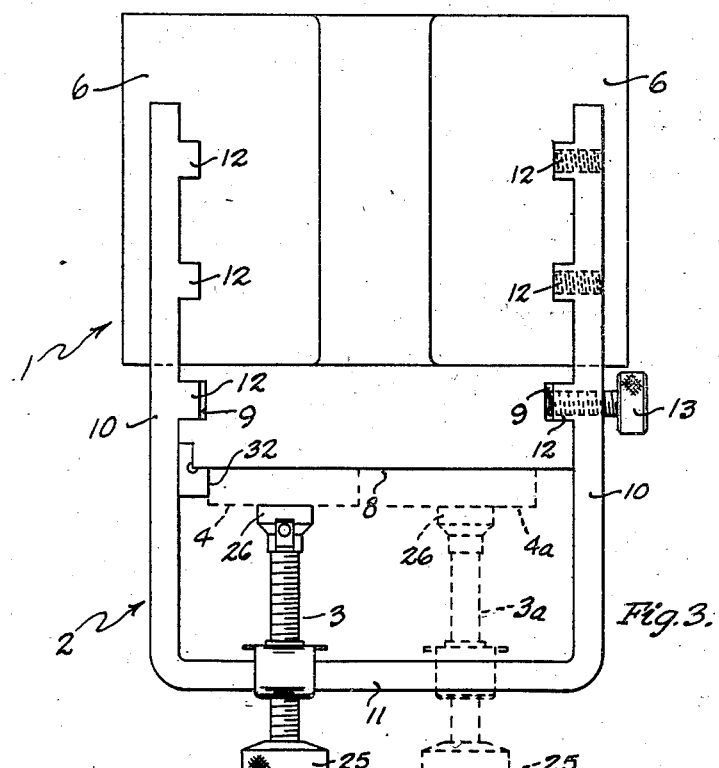
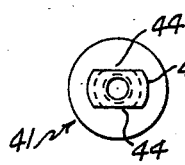
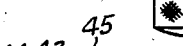
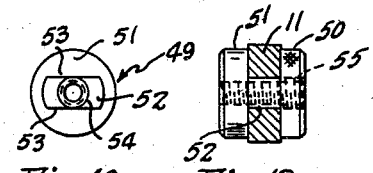
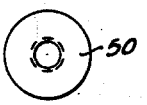
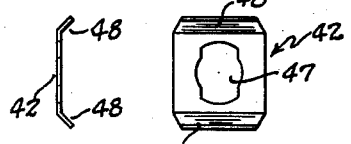
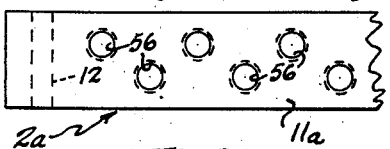
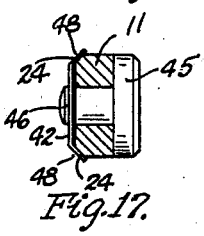
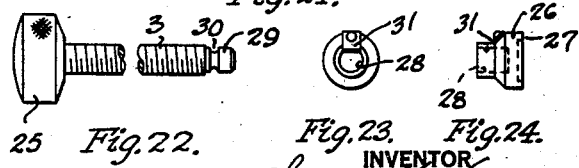
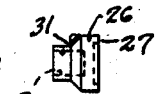
INVENTOR
Charles W. Varcoe
BY
Winster & Davis
ATTORNEYS Patented Mar. 25, 1947

2,418,059

UNITED STATES PATENT OFFICE 2,418,059

ANGLE PLATE CLAMPING BRACKET

Charles W. Varcoe, Danbury, Conn.

Application August 4, 1945, Serial No. 608,855

9 Claims. (Cl. 51—217)

This invention relates to a holding device for work pieces while performing various operations thereon, particularly to a clamping bracket for use by tool makers in clamping and holding pieces of work in performing certain operations such, for example, as grinding one edge surface of a block or other article, and has for an object to provide an improved and simple construction for more effectively and accurately holding the work piece and maintaining it in the proper position during the grinding or other operation.

Another object is to provide a construction which may be readily and quickly adjusted to hold different sizes of work pieces, and one in which the work pieces may be easily and quickly clamped or released.

A further object is to provide such a device which may readily be mounted and held on the table of a grinder or similar machine tool for performing the work operations.

With the foregoing and other objects in view, I have devised the construction illustrated in the accompanying drawings forming a part of this specification. It is, however, to be understood the device is not limited to the specific details of construction and arrangement shown, but may embody various changes and modifications within the scope of the invention.

In these drawings:

Fig. 1 is a side elevation of the preferred form of the holder with parts broken away to more clearly show the construction;

Fig. 2 is a front elevation thereof;

Fig. 3 is a top plan view;

Figs. 4 and 5 are a front and side view respectively of a mounting nut for the clamping screw;

Figs. 6 and 7 are a front and side view respectively of a spring clip for holding the nut of Figs. 4 and 5 in position;

Figs. 8 and 9 are a front and side view respectively of a modified form of nut for holding the clamping screw;

Figs. 10 and 11 are a front and side elevation respectively of a spring clip for holding the nut of Figs. 8 and 9 in position;

Fig. 12 is a section through the front part of the clamp showing the clamping screw mounting of Figs. 8 to 11 in position;

Figs. 13 and 14 are a front and side elevation respectively of another modified form of nut for mounting the clamping screw;

Figs. 15 and 16 are a side and front elevation respectively of the spring clip used for the nut of Figs. 13 and 14;

Fig. 17 is a section of the cross bar of the clamp showing the nut and mounting of Figs. 13 or 18 in place;

Fig. 18 is a cross section of the front bar of the clamp showing still another form of mounting nut for the clamping screw;

Fig. 19 is a front elevation of one element of the mounting means of Fig. 18;

Fig. 20 is a front elevation of another element of this mounting means;

Fig. 21 is a front elevation of a portion of a modified form of the front bar of the clamp;

Fig. 22 is a side elevation of a preferred form of clamping screw, and

Figs. 23 and 24 are a front and side view respectively of a preferred form of clamping head for such a screw.

Difficulty has been encountered with the present devices for holding various work pieces while performing various cutting and finishing operations thereon, such as operations performed by tool makers, for example, in which the work piece must be firmly clamped and held so that there is no danger of its shifting, and operations to produce accurately finished dimensions may be performed. The present device is very simple, is rugged and will accurately hold the work piece in proper position, and the piece may be easily and quickly clamped in or released from the holder. The device comprises an angle plate or block 1 carrying a bracket or frame 2 which in turn carries one or more clamping screws 3 for any suitable work piece, such, for example, as a block or plate 4, indicated in dotted lines, on which some machining operation is to be performed, such, for example, as grinding the upper edge surface 5.

The angle plate or block 1 comprises a horizontal base portion 6 adapted to rest on the work table 7 of a grinder or other machine tool and to be secured or clamped in position thereon by any suitable means, such, for example, as the usual clamping bolts (not shown) mounted in the usual T-shaped slots in the table, or held by a magnetic holder or other suitable means. At the forward edge of this base is an upright portion 8 provided in its opposite vertical side edges with upright grooves 9. The bracket 2 is of substantially U-shape comprising side arms 10 and the connecting front bar 11. The side arms 10 are each provided with one or more vertical cross ribs 12 on the inner walls thereof of a width to have a good sliding fit in the upright grooves 9 in the angle plate, and spaced at suitable distances longitudinally of the side arms. This permits the bracket to be adjusted vertically and clamped in the adjusted positions by any suitable means, such, for example, as a set screw 13 threaded in the side arm and adapted to be clamped against the bottom of one of the grooves 9. The side arm may be tapped for one of these clamping screws at each of the ribs 12 in the side arms, and it will be seen that by lifting the bracket from the angle plate or block any pair of ribs 12 may be inserted in the side grooves 9 to locate the front connecting cross bar 11 at different distances from the upright front wall 8 of the angle block, to accommodate different sizes or thicknesses of work pieces, as will presently be described. If desired, the rib and groove adjusting and mounting means may be reversed. That is, the ribs may be formed on the upright side edges of the wall 8, and corresponding grooves be formed in the side arms 10 in place of the rib 12.

The front cross bar 11 of the bracket or frame 2 is provided with a longitudinal slot 14 forming a guide for a nut 15 carrying the clamping screw 3. This nut is mounted in this slot to slide longitudinally of the bar and held in adjusted position by a spring clip 16. The nut comprises a head 17 resting against the inner side of the bar 11 and a shank 18 flattened on its opposite sides, as shown at 19, to substantially the width of the slot 14 so that the nut may slide longitudinally in the slot and is held against turning therein. On the opposite side of the head from the shank is a hub 20 adapted to seat in the opening 21 in the body of the spring clip 16, which clip is substantially U-shaped with side arms 22 adapted to engage over the upper and lower edges of the bar 11 and shaped at their free ends, as shown at 23, to grip the bar and yieldingly hold the nut in place. It is preferred that the forward edges of the bar be bevelled, as shown at 24, to cooperate with the gripping portions 23 to hold the nut and clamping screw 3 in place and permit ready adjustment of them along the bar. This spring clip also permits ready removal of the nut or mounting of the nut on the bar. All that is necessary is to snap the edges of the arms over the bar.

The nut 15 is threaded for the clamping screw 3 which includes a knurled head 25 for manipulating the screw and at its inner end is provided with a clamping head 26. This head is preferably removably mounted on the screw and also loosely mounted to have limited universal lateral rocking movement as well as permit turning movements of the head of the screw in this member so that it provides a removable pressure distributor for the screw. That is, the member 26 has a flat clamping surface 27, which, because the member is loose on the screw, may seat squarely on the face of the work piece 4, and it also provides a more extended clamping surface which will not mar the surface of the work piece. This member or clamping head 26 is provided with a socket 28 opposite the clamping surface 27 to receive the end 29 of the screw 3 which is loose in the socket to permit limited universal rocking movements of the clamping head 26. The screw adjacent the head 29 is provided with an annular groove 30 to receive the free end of a spring 31 carried by the head, which removably secures the head on the screw and allows relative rocking movement of the head and turning movement of the screw.

On one side edge of the upright front wall 8 is a side guide or work locating abutment 32. In the clamping of the work piece 4 it is placed against the front surface 8 with one edge against the guide 32 and with its top edge 5 projecting the desired distance above the top of the front wall 8, then it is clamped against the face of front wall 8 by setting the clamping screw 3, as indicated in Figs. 1 and 3, and then by merely setting the block or angle plate 1 on the bed 7 of the grinding machine or other machine tool and securing it either by clamps or a magnetic holder, the piece 4 may be run under the grinding wheel, for example, and the top edge surface 5 accurately ground as desired. For thicker pieces of work, the U-shaped bracket 2 may be lifted to remove the forward ribs 12 from the upright guide grooves 9 and the next rearward or any other pair of ribs 12 may be placed in these grooves 9. This will move the front connecting bar 11 forwardly to permit clamping of thicker work pieces 4 against the face 8, as will be readily understood. The nut 15 carrying the clamping screw 3, being slidable in the bar 11, permits adjusting the clamping screw to any desired position on the bar, and if a relatively long work piece 4 is to be held, as, for example, as indicated at 4a, Fig. 3, then a second clamping screw 3a may be mounted on the bar 11, as indicated in dotted lines Fig. 3, and the work piece clamped by two screws. The spring mounting 16 for the nut not only permits it to slide in the bar 11, but the spring arms will also yield to permit easy removal of the nut from the bar, or the application of another nut as desired.

A somewhat modified form of nut and mounting means is shown in Figs. 8 to 12 inclusive. In his case the nut is provided with a shank 34 and a head 35. The shank is flattened on its opposite sides at 36 to provide a width substantially that of the slot 14 in the bar 11, while the emaining portion of the shank is wider than he slot. The spring clip 37 is substantially U-shape and provided with an oblong opening 38 in the body portion thereof to permit passage of the shank 34 through it, and there is a groove 39 in the shank of the nut just under the head 35 of a diameter corresponding to the width of the opening 38. With this arrangement the shank 34 may be passed through the opening 38 until the body of the spring clip 37 is in alignment with the groove 39, then by turning of the nut or the spring 90 degrees, the wider portion of the shank 34 overlaps the sides of the opening 38 to retain the spring clip on the nut. The flattened shank of the nut may then be inserted in the groove 14 in the bar 11 and the arms 40 of the spring clip snapped over the edges of the bars to hold the nut in position, as shown in Fig. 12, and permit sliding of the nut along the bar to different adjusted positions.

Another somewhat modified mounting for the clamping screw 3 is shown in Figs. 13 to 17. This also comprises a nut 41 tapped to receive the screw, and a spring clip 42. In this case the nut has a shank 43 flattened at its opposite sides at 44 to slide in the slot 14 with an enlarged head 45 resting against the inner side of the bar 11, as shown in Fig. 17. The free end of the shank 43 has a head 46 which is flattened on its opposite sides corresponding to the shank 43 so that it may pass through the slot 14, and also a similarly shaped elongated opening 47 in the body of the clip 42, so that after the shank of the nut is inserted in the slot 14 this head may be passed through the opening 47 in the clip and then the clip turned through 90 degrees. This will bring the overhanging parts of the head 46 transversely of the opening 47 to retain the clip on the nut and the opposite ends of the clip may be bent inwardly somewhat as shown at 48 to frictionally engage the forward corners of the bar 11, and more specifically the bevelled surfaces 24 of this bar. This permits ready longitudinal adjustment of the nut and screw in the bar 11 as in the other forms shown and also permits ready mounting of the nut on the bar or its removal therefrom.

Still another somewhat modified form of nut is shown in Figs. 19 and 20. In this case the nut comprises a body 49 and a removable head 50. The nut includes a head 51 and a shank 52 flattened on its opposite sides as shown at 53 to fit the slot 14 in the bar 11, and outwardly of this flattened portion is a threaded free end portion 54 on which the head 50 may be threaded. In mounting this nut on the bar the flattened shank 52 is inserted in the slot 14 with the head 51 against one side of the bar, then the other head 50 is threaded onto the extension 54 on the opposite side of the bar, the shank 52 being of such a length that the member 50 is seated against the end of the shank so as not to clamp tightly against the bar 11 but will provide a good sliding fit with this bar. The nut is tapped, as shown at 55, for the clamping screw 3.

In Fig. 21 is shown one end portion of a modified form of connecting bar for the bracket 2. In this case the connecting bar 11a, instead of being provided with the longitudinal slot 14, is provided with a series of tapped openings 56 passing through the bar and preferably arranged in staggered relation, as shown in Fig. 21, so that a larger number may be formed in the bar. These openings are tapped to receive the clamping screw 3, and it will be seen that in placing the screw in different openings it may be mounted in different adjusted positions along the bar. However, the slidably mounted mounting nuts for the screws shown in the other views are preferred, as they permit quicker adjustment of the screw along the bar and also finer adjustment, as the nut may be moved to any desired position. It will be understood the bracket 2a of Fig. 21 will include these side arms 10 and the vertical ribs 12, as shown in Figs. 1, 2 and 3, so that this bracket may be mounted on the angle block in the same manner as the bracket 2.

It will be seen from the above that this provides a very simple holding means for the work piece which will effectively hold it in the desired position for accurate finishing operations thereto, that the work piece may be readily clamped and released, and that the holder itself with the work piece may be readily and quickly mounted on the bed or table of a machine tool or other support, such for example as that of a grinder or any similar type of machine.

Having thus set forth the nature of my invention, what I claim is:

1. A clamping bracket of the character described comprising an angle block including a base adapted to rest on a support and an upright wall, a substantially U-shaped bracket having arms and a connecting bar between said arms, cooperating means on the side edges of the upright wall and the arms of the bracket guiding the bracket for up and down adjustment, means for securing the bracket in adjusted positions, a clamping screw carried by the connecting bar of the bracket for clamping a work piece against said upright wall, and means for securing the screw in different positions longitudinally of the bar.

2. A clamping device for work pieces comprising an angle block including a base adapted to rest on a support and an upright wall provided with grooves in its upright side edges, a substantially U-shaped bracket having side arms and a connecting bar between said side arms and provided with a rib on each of its side arms adapted to slide in said grooves for up and down adjustment of the bracket with the connecting bar of the bracket located forwardly of said upright wall, means for securing the bracket in adjusted positions, means on said bar for clamping a work piece against said upright wall, and means for mounting said clamping means for longitudinal adjustment on the bar.

3. A clamping device for work pieces comprising an angle block including a base adapted to rest on a support and an upright front wall, a bracket including spaced side arms and a connecting bar between them, cooperating means on the side arms and the upright edges of said front wall guiding the bracket on the block for up and down adjustment with the connecting bar located forwardly of the front wall, a clamping screw on said connecting bar for clamping a work piece against the front wall, and means for mounting said screw for longitudinal adjustment on the bar.

4. A clamping device for work pieces comprising an angle block including a base adapted to rest on a support and an upright front wall, a bracket including spaced side arms and a connecting bar between them, cooperating guide grooves and ribs on the side edges of the front wall and the side arms of the bracket for guiding the bracket for up and down adjustment with the connecting bar located forwardly of said front wall, a clamping means on the connecting bar for clamping a work piece against the front wall, and means for mounting said clamping means for longitudinal adjustment on the bar.

5. A clamping device for work pieces comprising an angle block including a base adapted to rest on a support and an upright front wall, a bracket including spaced side arms and a connecting bar between them, said front wall being provided with upright guide means at its side edges, the side arms of the bracket being provided with a plurality of means to cooperate with said guide means to mount the bracket for up and down adjustment and spaced different distances from the connecting bar so that the bracket may be mounted on the block with the bar spaced different distances from the front wall, means for securing the bracket in different adjusted positions, a clamp on the connecting bar for clamping a work piece against the front wall, and means for mounting the clamp on the bar for longitudinal adjustment thereon.

6. A clamping device for work pieces comprising an angle block including a base adapted to rest on a support and an upright front wall, a bracket including spaced side arms and a connecting bar between them, means mounting the side arms of the bracket for vertical adjustment on the side edges of the front wall, said connecting bar being provided with a longitudinal slot, a nut mounted for longitudinal adjustment in the slot, and a clamping screw in the nut for clamping a work piece against the front wall.

7. A clamping device for work pieces comprising an angle block including a base adapted to rest on a support and an upright front wall, a bracket including spaced side arms and a connecting bar between them, cooperating means on the side arms and the upright edges of said front wall guiding the bracket on the block for up and down adjustment with the connecting bar located forwardly of the front wall, said connecting bar being provided with a longitudinal slot therein, a nut including a flattened shank mounted for sliding movement in the slot and a head at one side of the bar, a spring clip on the nut and including side arms engaging over the opposite edges of the bar to retain the nut in the slot, and a clamping screw threaded in the nut to clamp a work piece against the front wall.

8. A clamping device for work pieces comprising an angle block including a base adapted to rest on a support and an upright front wall, a bracket mounted on said block including a transverse bar spaced forwardly of the front wall and provided with a longitudinal slot therein, a nut including a flattened shank mounted for sliding movement in the slot and a head at one side of the bar, a spring clip on the nut including yieldable side arms engaging over the opposite edges of the bar to retain the nut in position, and a clamping screw threaded in the nut to clamp a work piece against the front wall.

9. A clamping device for work pieces comprising an angle block including a base adapted to rest on a support and an upright front wall, a bracket mounted on said block including a transverse bar spaced forwardly of the front wall and provided with a longitudinal slot therein, a nut including a shank mounted for sliding movement in the slot and a head located at one side of the bar, a flat spring clip including a body portion provided with an opening in which the nut is mounted and including spaced yieldable arms engaging over the opposite edges of the bar to retain the nut in the slot, and a clamping screw threaded in the nut to clamp a work piece against the front wall.

CHARLES W. VARCOE.

REFERENCES CITED

The following references are of record in the file of this patent:

UNITED STATES PATENTS

| Number | Name | Date |
|---|---|---|
| 1,802,914 | Gruber | Apr. 28, 1931 |
| 2,242,792 | Panzer | May 20, 1941 |
| 1,894,010 | Tautz | Jan. 10, 1933 |